(12) United States Patent
Zhang et al.

(10) Patent No.: US 10,224,073 B2
(45) Date of Patent: Mar. 5, 2019

(54) AUTO-DIRECTING MEDIA CONSTRUCTION

(71) Applicant: Tijee Corporation, Bellevue, WA (US)

(72) Inventors: Yong Zhang, Bellevue, WA (US);
Xiaoyong Zhou, Bellevue, WA (US)

(73) Assignee: Tijee Corporation, Bellevue, WA (US)

( * ) Notice: Subject to any disclaimer, the term of this patent is extended or adjusted under 35 U.S.C. 154(b) by 41 days.

(21) Appl. No.: 15/469,230

(22) Filed: Mar. 24, 2017

(65) Prior Publication Data
US 2018/0082716 A1 Mar. 22, 2018

Related U.S. Application Data

(60) Provisional application No. 62/397,862, filed on Sep. 21, 2016.

(51) Int. Cl.
*G11B 27/031* (2006.01)
*G06K 9/00* (2006.01)
*G06K 9/66* (2006.01)
*H04N 7/18* (2006.01)

(52) U.S. Cl.
CPC ........ *G11B 27/031* (2013.01); *G06K 9/00744* (2013.01); *G06K 9/66* (2013.01); *H04N 7/183* (2013.01); *G06K 2009/00738* (2013.01); *H04N 7/181* (2013.01)

(58) Field of Classification Search
CPC .................. G06K 9/00744; G11B 27/031
See application file for complete search history.

(56) References Cited

U.S. PATENT DOCUMENTS

| | | | | |
|---|---|---|---|---|
| 2003/0033347 | A1* | 2/2003 | Bolle | G06F 17/30253 718/107 |
| 2007/0098268 | A1* | 5/2007 | Beresford | G06F 17/30811 382/224 |
| 2013/0300939 | A1* | 11/2013 | Chou | G06K 9/00765 348/700 |
| 2014/0164636 | A1* | 6/2014 | Silvestri | H04L 67/325 709/231 |

OTHER PUBLICATIONS

International Searching Authority, International Search Report and Written Opinion, PCT Application No. PCT/US2017/051990, dated Nov. 30, 2017, 10 pages.

* cited by examiner

*Primary Examiner* — Thai Q Tran
*Assistant Examiner* — Girumsew Wendmagegn
(74) *Attorney, Agent, or Firm* — Perkins Coie LLP (57) ABSTRACT

Systems and methods are disclosed for automatically constructing output media stream from multiple input media sources by applying models learned from existing media products.

20 Claims, 7 Drawing Sheets

AUTO-DIRECTING MEDIA CONSTRUCTION

RELATED APPLICATION

This application claims priority under 35 U.S.C. § 119 to U.S. Provisional Application No. 62/397,862, filed Sep. 21, 2016, entitled "Systems and Methods for Auto-Directing Media Construction," the disclosure of which is incorporated by reference herein in its entirety.

BACKGROUND

The disclosed technology relates to media content construction, and in particular, to apparatuses, methods, and systems for constructing media streams across multiple media sources automatically.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The disclosed technology is directed to an auto-directing system that drives media-producing apparatuses to construct movie-like media streams from multiple input media sources to provide information in conjunction with broadcasting media content, entertainment media content, and/or media content that can be stored on, and/or played from, a storage and/or playing medium, including systems, methods, and apparatuses.

The disclosed technology enables media producing apparatuses to automatically select and adjust the proper media sources, view scopes, interesting points, composition layouts, scene transition effects, etc., and then construct movie-like media streams without human intervention.

The disclosed technology can be utilized to provide information related to, or regarding, live or prerecorded movies, surveillance systems, monitoring systems, television broadcasts, live shows, webcasts, online and/or mobile visual communications, and audio/video conferencing.

The information that can be provided by the disclosed technology may contain any type of media content, including but not limited to images, video, audio, and texts.

The information that can be provided by the disclosed technology can also be encoded into, multiplexed with, mixed with, and/or transmitted in conjunction with media content related to, or regarding, scene descriptions, alarms, environmental data, conversations, advertisements, and/or other information of any kind of form.

The apparatus of the disclosed technology includes one or more media sources, and at least one of the media sources can provide motion picture content. Each media source can be an image sensor, an individual camera, a panoramic camera with multiple image sensors, a distributed individual camera system, a microphone, a live and/or stored motion picture stream, or a media source in any kind of media form, including combinations.

The disclosed technology consists of at least one auto-directing engine component that drives one or more media processors and media encoders to construct the output media stream, whose content is a composition of full or partial content from one or multiple input media sources, with or without modification. The constructed media stream can be configured to conform to the format of motion pictures, panoramic video, virtual reality (VR) video, three-dimensional (3D) video, or two-dimensional (2D) video.

The disclosed technology may include a media transport apparatus that controls the transfer of the output media steam to designated media consuming devices via a wired connection or wireless connection.

The disclosed technology may include various media consuming devices that are capable of receiving motion pictures, 2D video, 3D video, and/or VR video directly or via a media relay device as well as showing such content on a display device and/or storing such content on a storage device.

The disclosed technology may include a learning subsystem that learns movie editing skills from other movie products, alongside with preset editing rules, if available, to generate auto-directing models for the auto-directing engine to match and apply editing actions at runtime.

Figure 1:
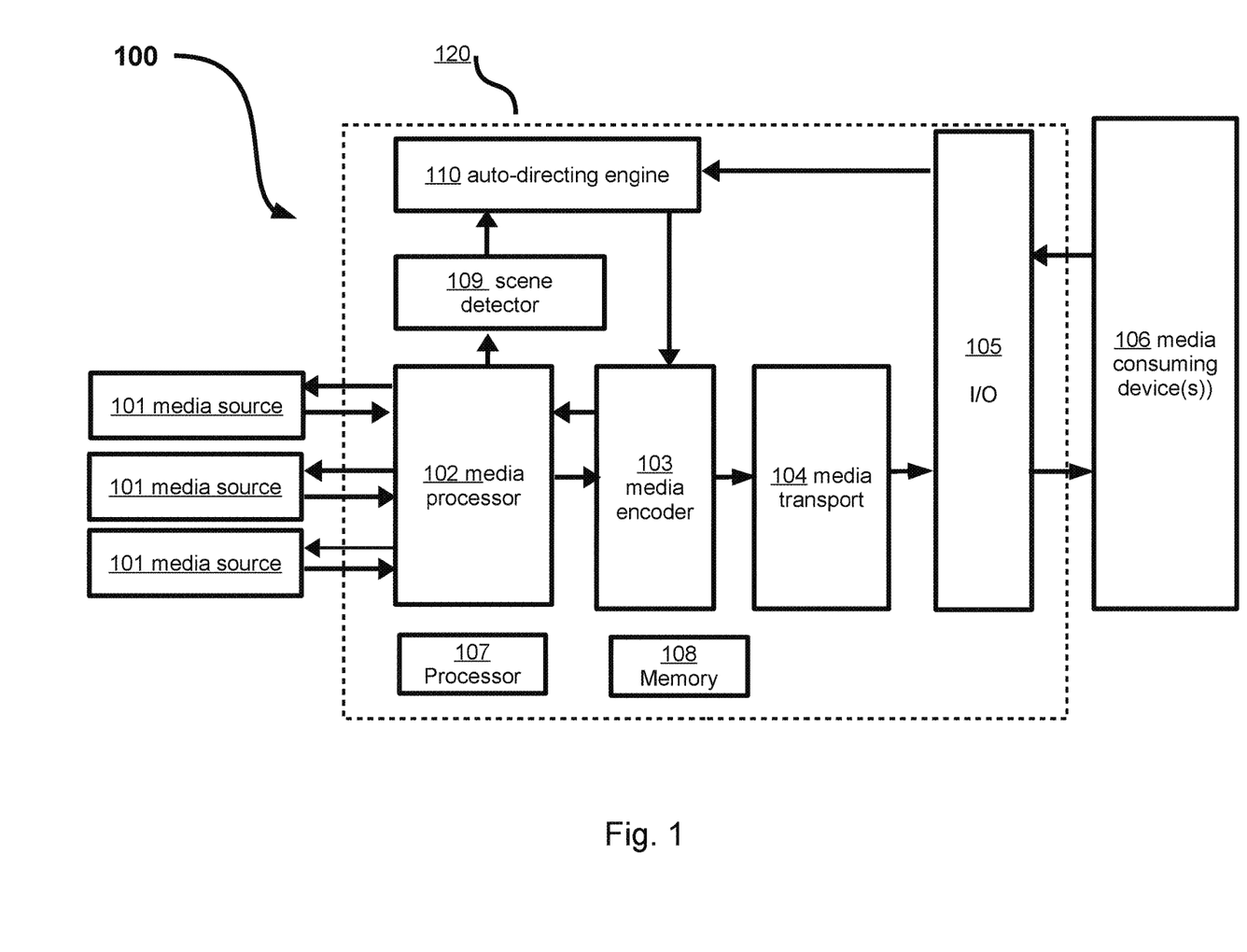
FIG. 1 is a block diagram illustrating an example configuration of an auto-directing system in accordance with some implementations of the disclosed technology.

FIG. 1 is a block diagram illustrating an example auto-directing system 100 that contains one or multiple media sources 101, an auto-directing framework 120, and one or multiple media consuming devices 106. The media sources 101 provide input media data, such as images, video, audio, and text. The auto-directing framework 120 constructs the dynamic movie stream automatically. The media consuming devices 106 are the end points that receive the constructed video stream, directly or via any kind of media relay, and show the video stream on a display device and/or store it in media storage.

The auto-directing framework 120 includes at least one media processor 102 that selects data from connected media sources 101 and constructs frame data for at least one media encoder 103, a scene detector 109 that detects event/scene changes, an auto-directing engine 110 that generates a temporal directing script, at least one media encoder 103 that produces encoded media frames, one or multiple optional media transport components 104 that control the output media stream transfer, and an input/output (I/O) component 105 as an interface for sending and receiving data from and/or to the auto-directing framework 120. The auto-directing framework 120 may also include at least one processor 107 and at least one memory 108.

Figure 2:
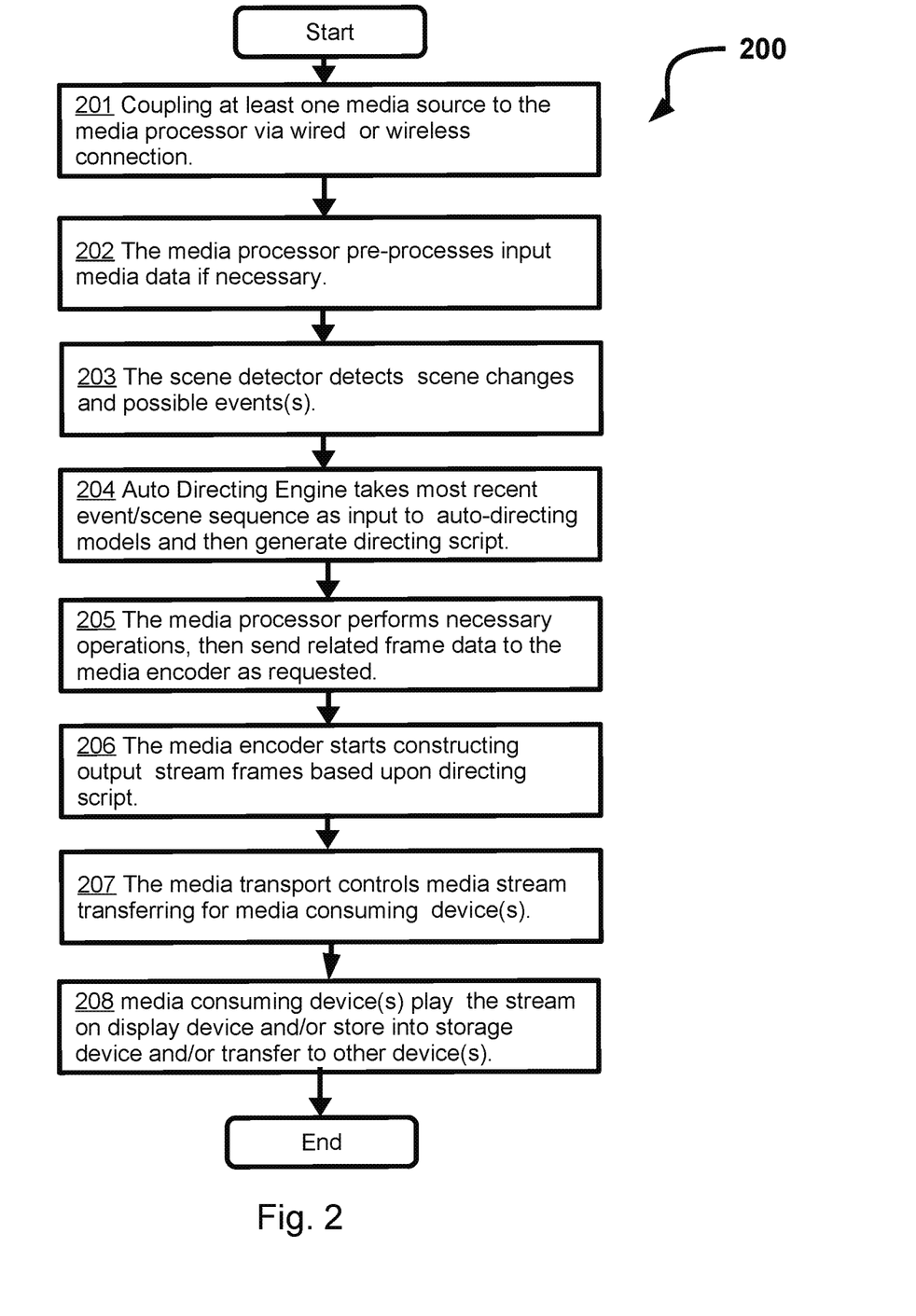
FIG. 2 is a flowchart illustrating an example auto-directing processing method in accordance with some implementations of the disclosed technology.

FIG. 2 is a flowchart illustrating an example auto-directing processing method. At step 201, various media sources—including imaging sensors, live cameras, panoramic cameras, motion picture content on storage media, media streams from other devices or systems, and audio from sound sensors—provide input data to the media processor(s) via directly coupled circuits and wired or wireless communication channels. At step 202, if necessary, one or multiple media processors preprocess input media data utilizing processing methods such as noise reduction, background extraction or removal, lens correction, normalization, etc. At step 203, the scene detector determines the presence of any event taking place and the corresponding scene category of each media source by analyzing media content including history, matching extracted features (e.g., edges & shapes in image, audio spectrum), generated and extracted within the same step 203, with preset/pre-trained features (e.g., classifiers for face detection, animal type detection, alarm sound detection) and detecting the similarity of content and changes in content. An event or scene is represented by extracted features that can be used to identify similar events or scenes. Video/image features can be represented by positions of edges and shapes, and audio features can be represented by audio spectrum data. One example of scene detector can be algorithms that apply image/face recognition to identify scenes that involve human faces, or even associate faces in video images with actual persons' names.

At step 204, the auto-directing engine first takes the current scene/event along with some previously detected scenes/events as input for a preset/pre-trained auto-directing model, then generates a directing script based upon the output of the auto-directing model. For example, continuous image frames of two persons with alternating high pitch and low pitch human voices, when provided as input for auto-directing model, may lead to directing scripts that are suitable for conversation scenes. An example directing script may contain movie editing actions describing how to construct the next media frames within a time window, including but not limited to selecting media sources, selecting view windows, applying scene transition effects, cropping, zooming, determining focus points, selecting composition layouts, adding subtitles, and any other actions that can guide the construction of media frame.

At step 205, one or multiple media encoders construct new frames based upon the directing script. Based on the directing script, step 205 determines what is the video data source for the current frame. Furthermore, step 205 also determines the relative position of the media frame to be constructed within the image frame from that source, according to the directing script. Similar to video/image frame construction, step 205 determines how to construct the audio data for the current frame according to the directing script. Step 205 may require the corresponding media processor or processors to do necessary operations, such as image cropping, image transforming, and stitching. At step 206, the constructed media frames are encoded into the format suitable for consuming devices to use. The encoding format can be, for example, H.264, H.265, WebM, MPEG, MPEG2, or any kind of compressed or uncompressed format that can be utilized by the media consuming device or devices. At step 207, various media transport components control the transfer of the media stream onto either media consuming devices or media relay devices. At step 208, end-point media consuming devices receive the media stream via a wired connection, a wireless connection, or a media relay device, then decode and play the content on display devices and/or store the content onto storage devices.

The term "event" may refer to an action or movement of one or more subjects, such as "a person starts crying," "a dog jumps," etc. The term "scene" may refer to one or more locations including environmental elements that construct a view, such as "a woman is cooking in a kitchen", "two boys are arguing in playroom", "a man is painting the living room wall". Usually, an event occurs within a specific scene or scenes. The term "feature" or "features" may correspond to one or multiple attributes of media that can be used to identify certain content or distinguish certain content from other content. Example features may include, but not limited to, recognized object category names, wave energy level changes, frequency spectrums, color histograms of images, patterns, and parameters of an artificial neural network based classifier.

Figure 6:
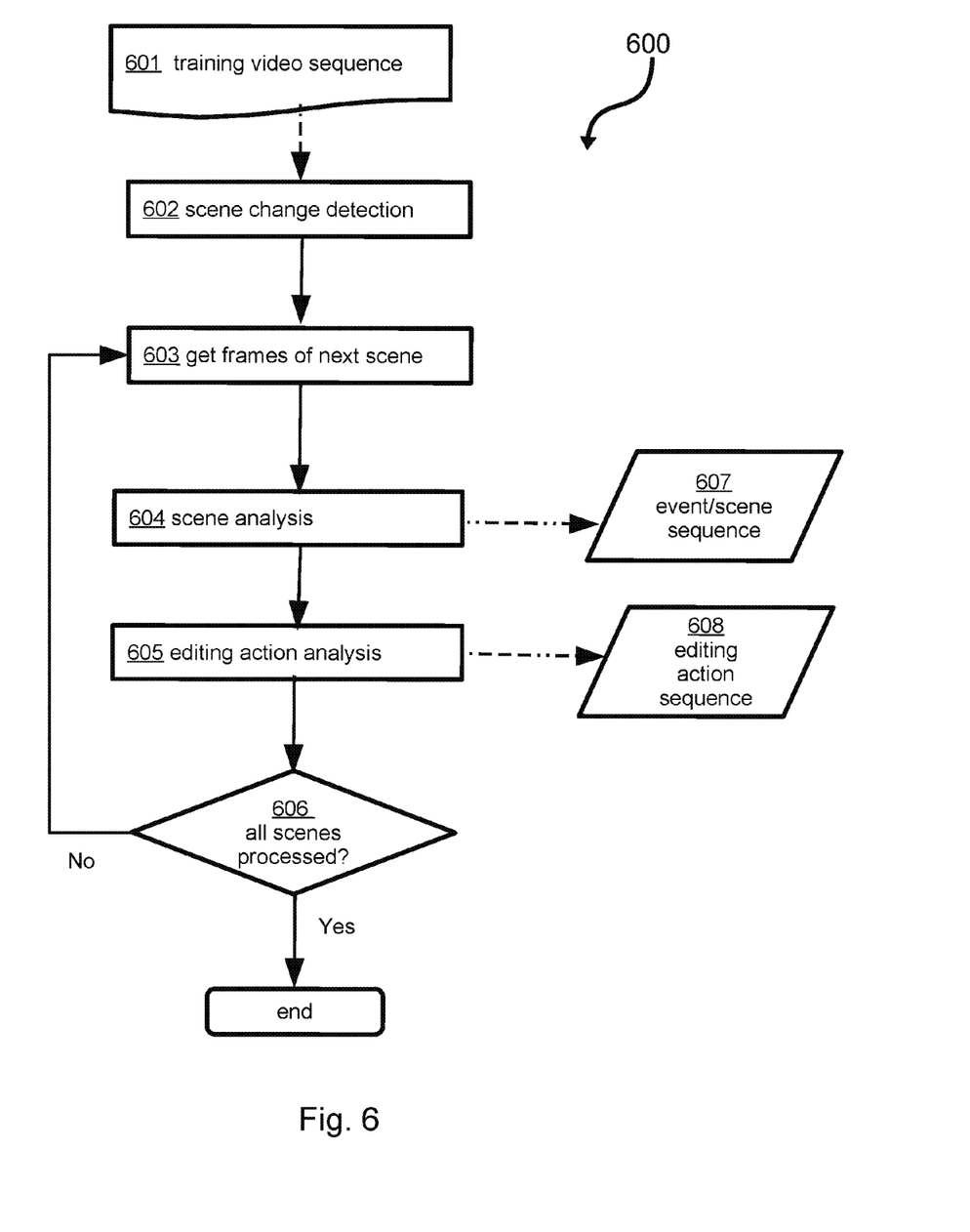
FIG. 6 is a flowchart illustrating preprocessing steps of an example configuration of a learning subsystem for preprocessing training data, in accordance with some implementations of the disclosed technology.
Figure 7:
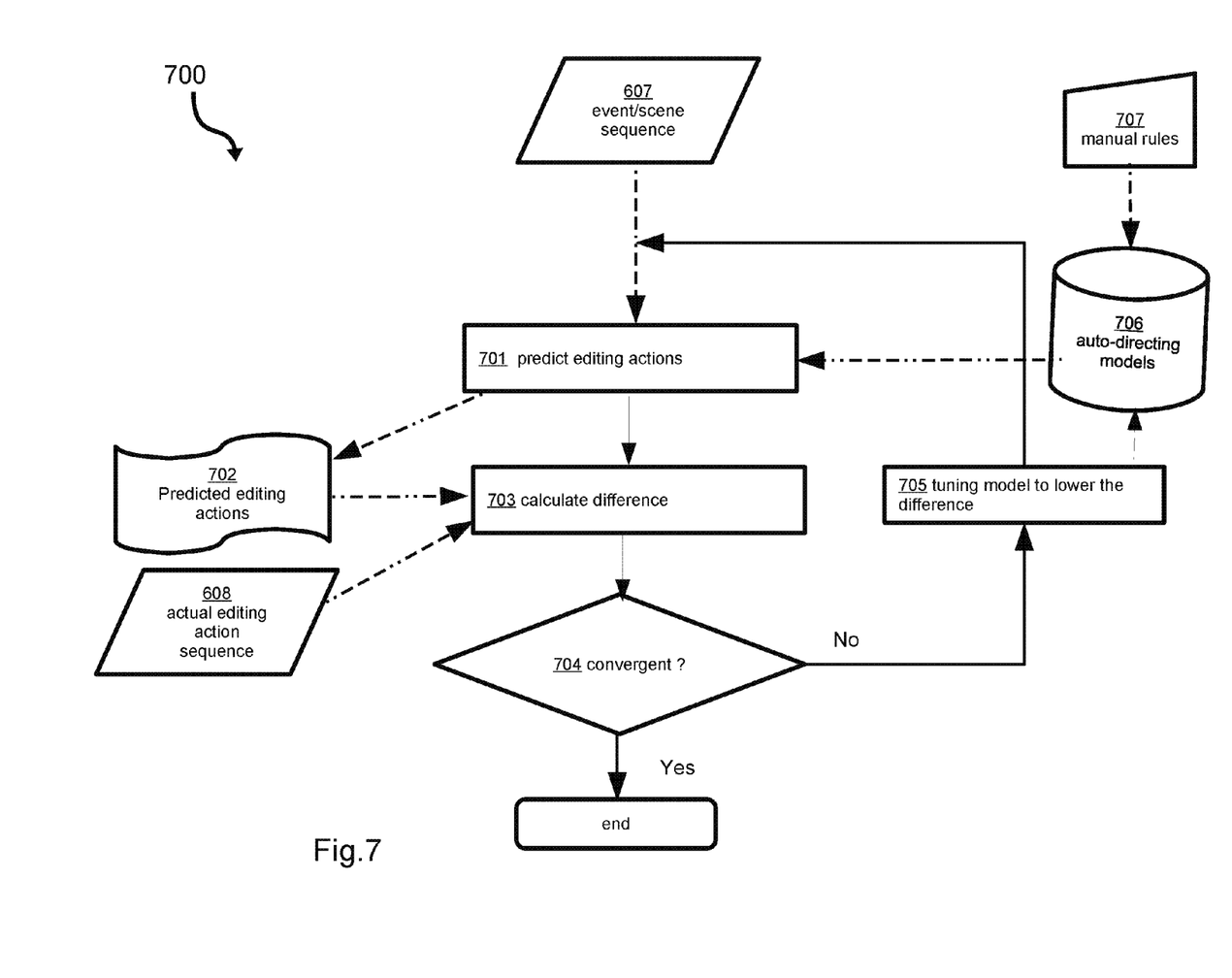
FIG. 7 is a flowchart illustrating processing steps of an example configuration of the learning subsystem for generating auto-directing models, in accordance with some implementations of the disclosed technology.

Still referring to the auto-directing processing method illustrated in FIG. 2, the auto-directing model(s) can be generated by a learning subsystem (see FIG. 6 and FIG. 7). The auto-directing model may contain information of $P(S_i|S, E)$, $P(A_i|S, E)$ and $P(A_k|A)$, where $S=\{S_t, S_{t-1}, \ldots S_{t-n}\}$ denotes a scene change sequence, $E=\{E_t, E_{t-1}, E_{t-2}, \ldots, E_{t-n}\}$ denotes an event sequence, and $A=\{A_t, A_{t+1}, \ldots, A_{t+m}\}$ denotes a movie editing action sequence for a time window from t to t+m. With $S_i$ denoting the i-th scene, $P(S_i|S, E)$ predicts the possibility of choosing scene $S_i$ for the next frame based on the known scene/event sequence $\{S, E\}$. With $A_i$ denoting the i-th movie editing action, $P(A_i|S, E)$ predicts the possibility of taking movie editing action $A_i$ based on the known event/scene sequence $\{S, E\}$. $P(A_k|A)$ predicts the possibility of taking the next editing action $A_k$ based on the previous editing action sequence A. Parameter-wise, n and m can be chosen from integers greater than or equal to 0. The auto-directing model(s) can be stored in memory as statistic probabilities, as parameters of an artificial neutral network, or in any other form that can be used to predict the next movie editing action based on known events, scenes, and/or previous editing actions.

At run time, the scene director manages a recent scene/event sequence $\{S, E\}$ for the time window from t–n to t. Then, triggered either by a predetermined time interval set by earlier actions of auto-directing engine (e.g. "do not change view for 5 seconds") or a scene/event change (e.g., "person C starts to move and talk"), the auto-directing engine selects the most likely editing action sequence $A=\{A_t, A_{t+1}, \ldots, A_{t+m}\}$, which has a best overall score (e.g., a global or local maximum value of likelihood) computed based on information of $P(S_i|, S, E)$, $P(A_i|S_i, S, E_1, E)$, and $P(A_k|A)$ stored in auto-directing models. The editing action can be, for example, switching between media sources, changing the image view window, rotating the image, changing the focus, tracking objects, zooming, fading in or out, or changing the layout.

Figure 3:
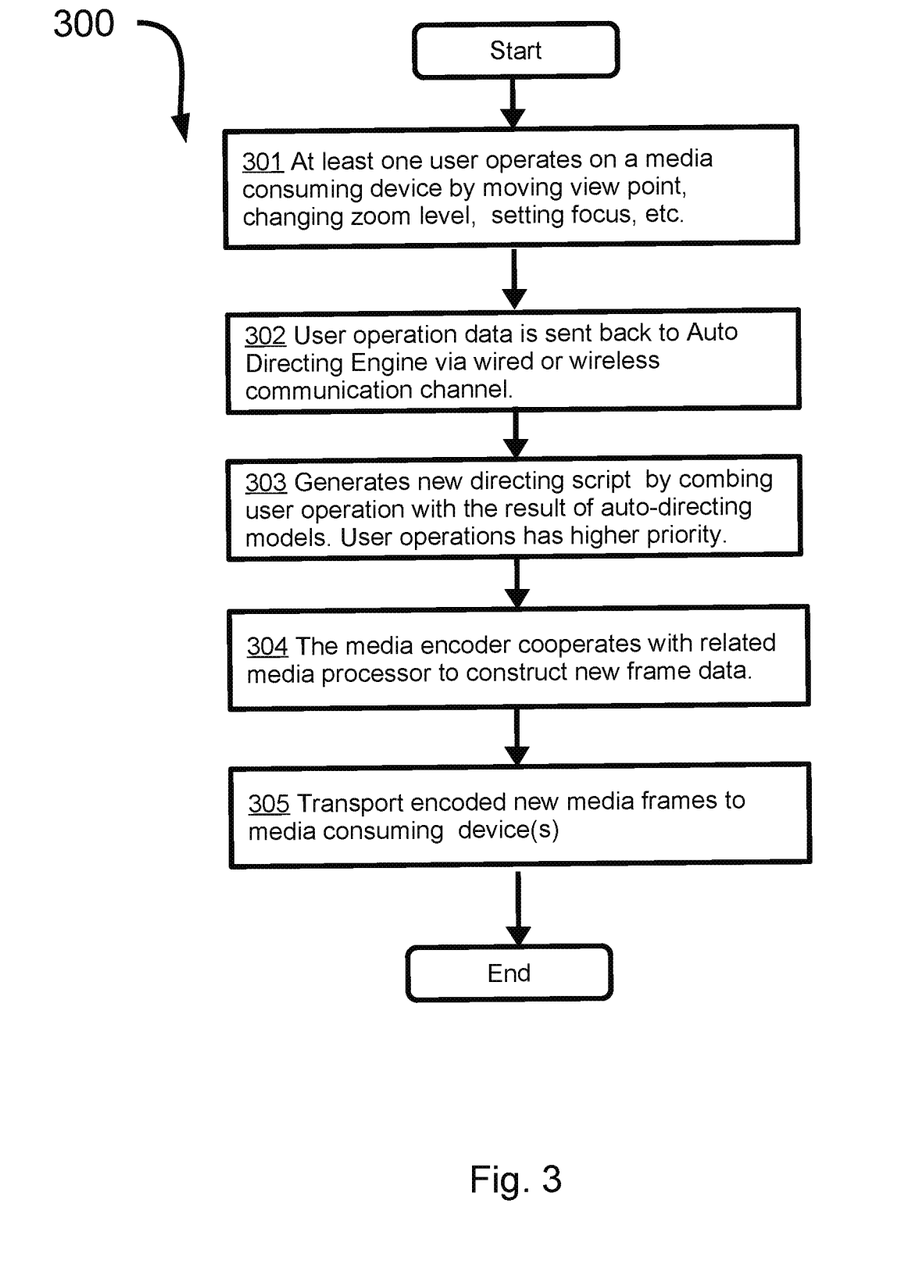
FIG. 3 is a flowchart illustrating an example method for auto-directing engine to process user operations in accordance with some implementations of the disclosed technology.

FIG. 3 is a flowchart that illustrates an example method for the auto-directing engine to process user operations. At step 301, at least one user operates on a media consuming device (e.g., moving the viewpoint, changing the zoom level, or setting the focus). At step 302, operation data are sent back to the auto-directing engine via wired or wireless communication channels, either directly or indirectly. At step 303, the auto-directing engine generates a new directing script by combining user operations and auto-directing results. When conflicts are present, user operations may have higher priority than the auto-directing results. For example, auto-directing engine might generate script "Follow audience A from time 1:05:10 to 1:10:10" while at the same time, user operation is "Follow lecturer from time 1:05:10 to infinite." In this case, the script of user operation overrides auto-directing engine until future user operation(s) at a later time. At step 304, one or more media encoders work with a corresponding media processor to construct new media content for the following frames within a desired time window. At step 305, one or more consuming devices receive a newly constructed media stream via a wired connection or wireless connection.

Figure 4:
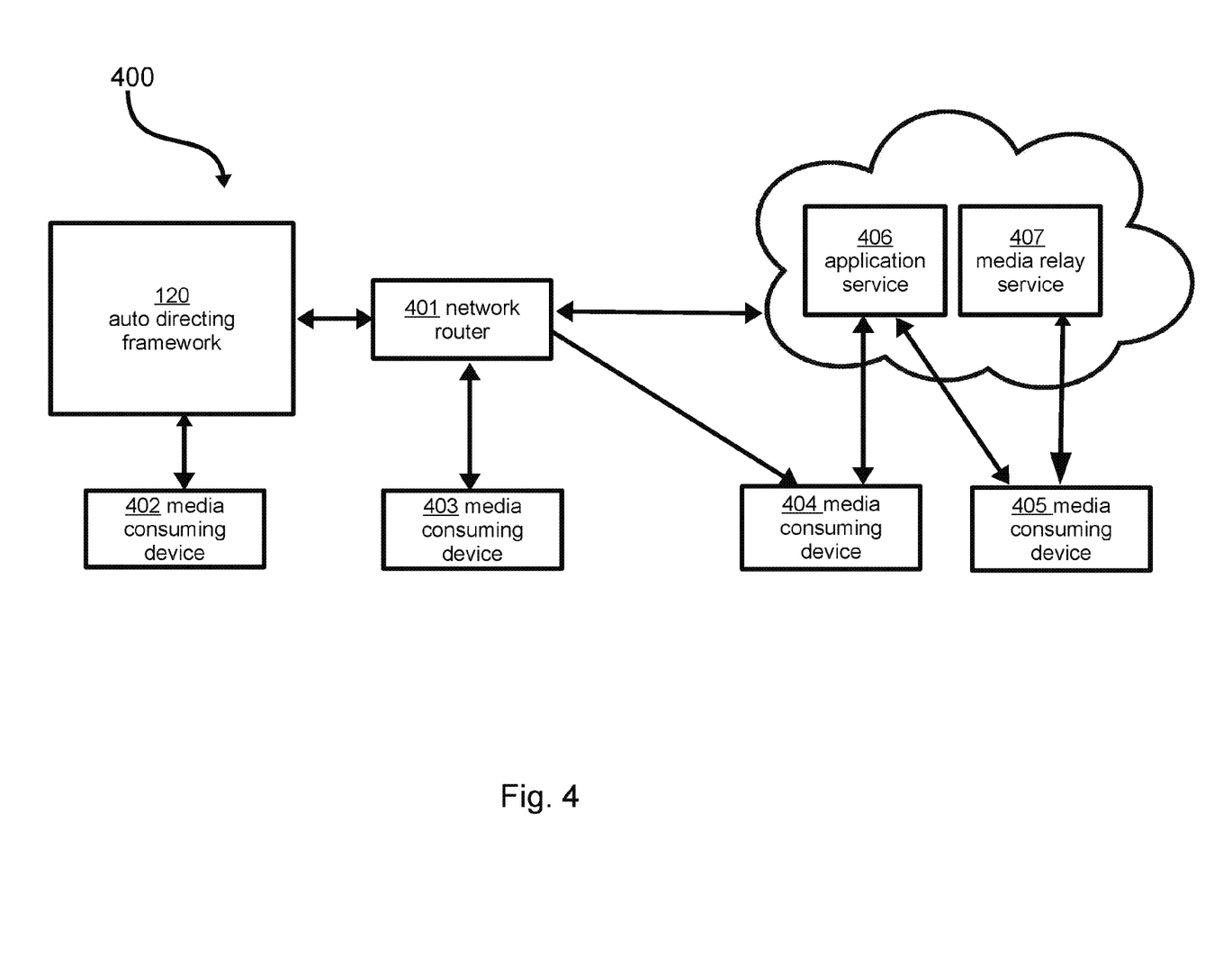
FIG. 4 is a block diagram illustrating an example configuration of an auto-directing system with various types of media consuming devices, in accordance with some implementations of the disclosed technology.

FIG. 4 is a block diagram illustrating an example configuration of an auto-directing system with various types of media consuming devices. The device contains an auto-directing framework 120 to produce a movie-like constructed media stream. An example media consuming device 402 connects to the media output interface port of auto-directing framework 120, such as an HDMI port, a Mini DisplayPort, a USB port, etc., to receive media data. An example media consuming device 403 connects to the auto-directing framework 120 via a network router 401 with a wired network connection or a wireless Wi-Fi connection. An example media consuming device 404 can indirectly communicate with the auto-directing framework 120 through a cloud-based application service 406. The application service 406 helps establish a direct media stream connection between remote devices. And another example media consuming device 405 receives a media stream transferred via an intermediary media relay service 407. The media relay service 407 transmits media data from a previous node to the next one or many nodes in the middle of a pipeline. Other media consuming devices can include but are not limited to devices that receive media streams via broadcasting services, content delivery networks (CDNs), and internal coupled storage cards or disks.

Figure 5:
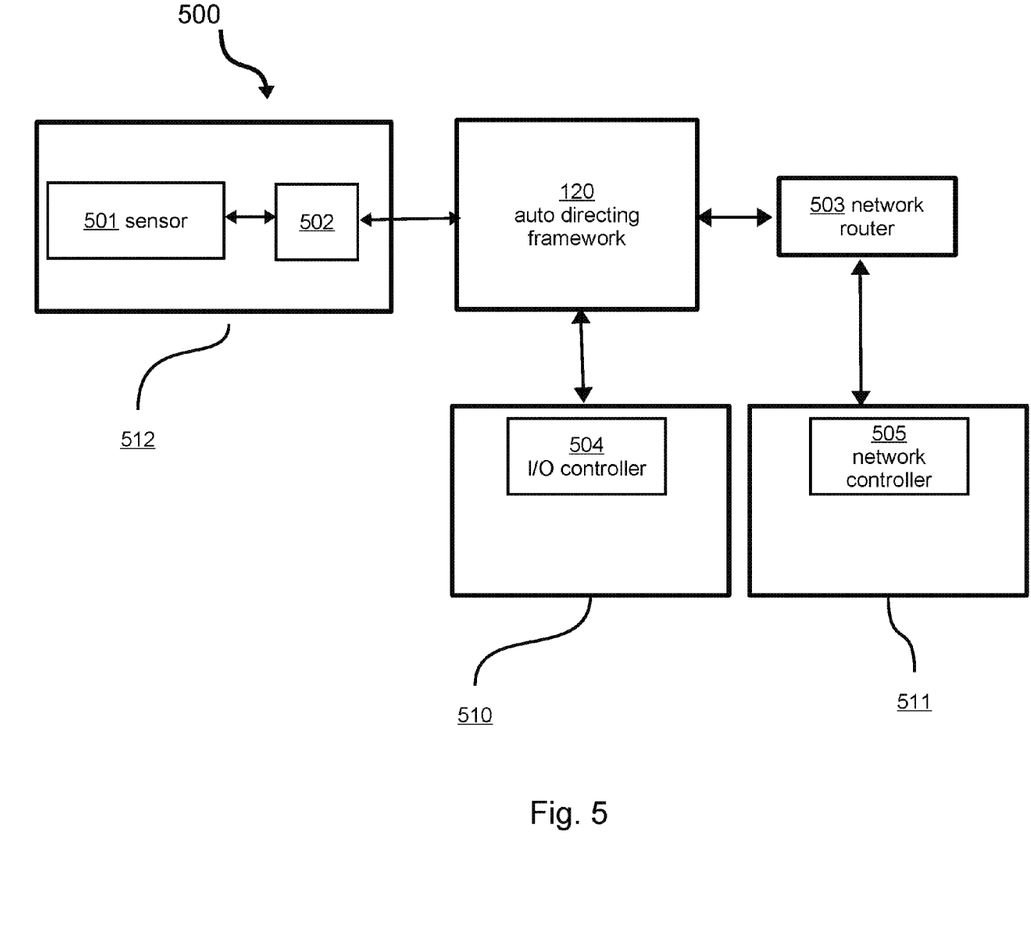
FIG. 5 is a block diagram illustrating an example configuration of an auto-directing system with various types of media sources, in accordance with some implementations of the disclosed technology.

FIG. 5 is a block diagram that illustrates an example configuration of an auto-directing system with various media sources. The auto-directing framework 120 contains an auto-directing framework to produce a movie-like constructed media stream. An example device 512, including a sensor 501 and a special purpose circuit interface 502, is a media source coupled directly to the framework 120. The sensor 501 can be an image sensor, a sound sensor, or any other sensor that can capture media data. The special purpose circuit interface 502 provides communication interfaces between the device 512 and device 120. Examples of the special purpose circuit interface may include, but not limited to, an Inter-Integrated Circuit (I2C) interface, an Integrated Inter-IC Sound Bus (I2S) interface, a Serial Peripheral Interface (SPI), a Camera Serial Interface (CSI), a High-Definition Multimedia Interface (HDMI), a Camera Parallel Interface (CPI), a Low-Voltage Differential Signaling (LVDS) interface, and a sub-LVDS interface. A device 512 may contain various internal signal processors, such as an Image Signal Processor (ISP), Digital Signal Processor (DSP), System on Chip (SoC), Application Specific Integrated Circuit (ASIC), Field Programmable Gate Array (FPGA) circuit, etc. A device 510 is an example media source connecting a general purpose input port of the device 120 to provide media content, for example, a USB camera or a microphone. The device 510 includes at least one I/O controller 504 that controls the data transfer over a general I/O protocol. A device 511 is another example media source that provides media content data to the auto-directing framework via a network router 503, for example, an IP camera or a media server. The device 511 includes at least a network controller 505 that controls the data transfer over a wired network connection or wireless Wi-Fi connection.

FIG. 6 is a flowchart illustrating pre-processing steps of an example configuration of a learning subsystem for pre-processing training data. At step 601, the learning subsystem loads a training video sequence as input, and then at step 602 it divides the video sequence into temporal segments by detecting major changes (e.g., a cut, a contrast cut, a fade in/out, or a wipe, as generally understood in filming terminologies) between adjacent frames. Each temporal segment represents a sequence of frames captured from a unique and continuous record from a camera configuration (e.g., view depth, color theme, viewing angle, etc.). The major changes either can be automatically detected by comparing the extracted visual/sound/conceptual features between adjacent frames and/or can be pre-marked by a person. For example, when the first frame contains features described as "a boat on the ocean" while the next frame contains features described as "a woman standing on the shore", step 602 will detect this major change. Afterwards the learning subsystem processes each of the segments from step 603 to 606 until all segments are processed.

Step 603 gets all frames of the next scene according to the scene division based on the results from step 602.

Step 604 analyzes the frames of the next scene from step 603, by either manually marking/labeling or applying detection and recognition methods known in the artificial intelligence (AI) field (e.g., human face detection, furniture detection, etc.), to generate event/scene sequence 607. An example of a scene could be "Time [1:10:15-1:10:25], a woman stands still on sea shore."

Step 605 analyzes the frame. If there is any difference in parameters between the current frame and previous frame, e.g. any parameter in {TopLeft Position, BottomRight Position, ViewDepth, FocusPoint Position, ColorFilterApplied} or other parameters, these changes may be optionally added as new editing action accordingly to the editing action sequence 608.

Decision step 606 verifies whether there are yet unprocessed scenes or not. An event/scene may be represented by extracted/recognized features that can identify the same or a similar event/scene. Generated sequence data are stored in memory for further processing (see FIG. 7). The editing action sequence represents the way a segment was produced, such as scene selection, scene transition methods, art effects, composition layout, cropping, zooming, camera distance, and any other elements that can be used to help generate similar media frames.

FIG. 7 is a flowchart illustrating processing steps of an example configuration of the learning subsystem for generating auto-directing models based upon the data generated from the preprocessing steps (see FIG. 6). The example configuration shown in FIG. 7 illustrates learning methods based on an artificial neural network. Step 701 applies auto-directing models 706 to 607 event/scene sequence and predicts what editing actions should be used. The predicted editing actions 702 are used to be compared with 608 actual editing action sequence in step 703 where difference is calculated. If decision step 704 finds out that the difference is greater than a preset threshold (i.e., not convergent), step 705 will be executed to tune 706 auto-directing models to lower that difference. This process continues to repeat until the result of step 703 converges. Other configuration methods that are not shown in FIG. 7 include maximum-likelihood estimation method, direct probability calculation method based on a generated event/scene/action sequence, etc. The final output data of the learning subsystem include at least auto-directing models 706 (e.g., stored in a database), which contain information of $P(S_i|S, E)$, $P(A_i|S, E)$, and $P(A_k|A)$, as described in reference to FIG. 2 above. As shown in step 707 of FIG. 7, the learning subsystem can accept preset rules to be part of the auto-directing models. A preset rule may be a manually edited rule that describes the desired scene choice and/or movie editing actions in a specific situation. In some embodiments, preset rules may have higher weights or priorities than automatically learned models.

The disclosed technology provides the following effects or advantages, without limitation. First, the disclosed technology may enable automatically construction of attractive media content by applying knowledge learned from other movie products, as well as knowledge from preset rules. Second, instead of transferring large amount of data, implementation of the disclosed technology may reduce the total usage of network bandwidth for media consuming devices by only delivering interesting portions of media content at certain moments. Third, the disclosed technology provides much more natural and convenient method(s) for a user to watch high-definition video content from multiple cameras that cover a wide area.

The term "processor" as used in the present document, refers to an electronic circuit performing operations on some data source according to computer-executable instructions or programs, which can include, for example, a general purpose central processing unit (CPU) processor, a graphics processing unit (GPU), a special purpose processor, a digital signal processor (DSP), a plurality of microprocessors, a system on a chip (SoC), one or more microprocessors in association with a DSP, an application-specific integrated circuit (ASIC), a field-programmable gate array (FPGA) circuit, an embedded systems module, and any other integrated circuit (IC) or state machine.

The term "memory," as used in the present document, is a computer-readable storage medium that can include, but is not limited to, one of or any combination of the following: read only memory (ROM), random access memory (RAM), flash memory, cache memory, a semiconductor memory device, and a magnetic media device. Memory can be embedded internally and/or can be an accessible external device attached to the processor.

Any of the disclosed methods in the disclosed technology may be implemented as computer-executable instructions, computer program products, application-specific integrated circuits (ASICs), field programmable gate array (FPGA) circuits, etc. Such instructions or circuits may cause a computer to perform any of the disclosed methods. Generally, as used herein, the term "computer" refers to any computing device or system.

Although the operations of some of the disclosed methods in the disclosed technology are described in a particular, sequential order for convenient presentation, it is to be understood that this manner of description encompasses rearrangement, unless a particular order is required by specific language set forth herein. For example, operations described sequentially may in some cases be rearranged or performed concurrently.

As used in this application and in the claims, a list of items joined by the term "and/or" may mean any combination of the listed items. For example, the phrase "A, B, and/or C"

may mean A; B; C; A and B; A and C; B and C; or A, B, and C. As used in this application and in the claims, a list of items joined by the term "at least one of" may mean any combination of the listed terms. For example, the phrases "at least one of A, B, or C" may mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed embodiments, alone and in various combinations and sub-combinations with one another. The disclosed methods, apparatuses, and systems are not limited to any specific aspect or feature or combination thereof, nor do the disclosed embodiments require that any one or more specific advantages be present or problems be solved.

Theories of operation, scientific principles, or other theoretical descriptions presented herein in reference to the apparatuses or methods of this disclosure have been provided for the purpose of better understanding and are not intended to be limiting in scope. The apparatuses and methods in the appended claims are not limited to those apparatuses and methods that function in the manner described by such theories of operation.

The invention claimed is:

1. A computer-implemented method, comprising:
   dividing training media content temporally into training media segments, wherein each training media segment corresponds to a temporally continuous sequence of media content captured in accordance with a distinct configuration;
   analyzing the training media segments to generate at least one auto-directing models including a plurality of conditional probabilities for predicting editing actions;
   applying the at least one auto-directing model to media content streamed from one or more media sources to generate a directing script,
      wherein the directing script is separate from the media content streamed from the one or more media sources and includes a series of editing actions applicable to media content;
   executing the directing script toward media content streamed from the one or more media sources to construct edited media content; and
   causing presentation of the edited media content to a user.

2. The method of claim 1, wherein analyzing the training media segments comprises:
   identifying events and scenes from the training media segments to generate a sequence of events and scenes;
   applying a base auto-directing model to the sequence of events of scenes to predict one or more editing actions; and
   comparing the predicted one or more editing actions with one or more observed editing actions.

3. The method of claim 1, wherein dividing one or more training media content further comprises:
   extracting one or more features from individual frames of the training media content; and
   comparing the features extracted temporally adjacent frames.

4. The method of claim 1, wherein dividing one or more training media content is based, at least in part, on predetermined marks on the training media content.

5. The method of claim 1, wherein analyzing the training media segments comprises identifying at least one sequence of events or scenes from the training media segments.

6. The method of claim 5, wherein each event corresponds to an action or movement of one or more subjects and each scene corresponds to a location with environmental context.

7. The method of claim 1, wherein the directing script comprises editing actions applicable to media content streamed from the one or more media sources within a time window.

8. The method of claim 7, wherein the editing actions comprise at least one of selecting at least one media source, selecting at least one view window, applying at least one scene transition effect, cropping, zooming, determining at least one focus point, selecting at least one composition layout, or adding at least one subtitle.

9. A non-transitory computer-readable medium storing computer-executable instructions that, when executed by one or more processors, cause the one or more processors to perform operations comprising:
   applying at least one auto-directing model to media content obtained from one or more media sources during a first period of time to generate a directing script,
      wherein the directing script includes one or more editing actions applicable to media content, and
      wherein the at least one auto-directing model comprises a plurality of conditional probabilities for predicting editing actions;
   causing performance of the one or more editing actions toward media content obtained from the one or more media sources during a second period of time to construct an output media content; and
   causing presentation of the output media content to one or more users.

10. The non-transitory computer-readable medium of claim 9, wherein the one or more media sources comprise at least one of an image sensor, individual camera, panoramic camera, distributed camera system, microphone, live motion picture stream, or stored motion picture stream.

11. The non-transitory computer-readable medium of claim 9, wherein applying the at least one auto-directing model to media content obtained from one or more media sources during a first period of time comprises extracting one or more features from the media content obtained from one or more media sources.

12. The non-transitory computer-readable medium of claim 11, wherein the one or more features comprise at least one of object category names, wave energy level changes, frequency spectrums, color histograms, or parameters of an artificial neural network based classifier.

13. The non-transitory computer-readable medium of claim 9, wherein applying the at least one auto-directing model to media content obtained from one or more media sources during a first period of time comprises determining a sequence of events from the media content.

14. The non-transitory computer-readable medium of claim 13, wherein at least a subset of the plurality of conditional probabilities can be evaluated, at least in part, on the sequence of events.

15. The non-transitory computer-readable medium of claim 13, wherein applying the at least one auto-directing model to media content obtained from one or more media sources during a first period of time further comprises determining a sequence of scenes from the media content.

16. The non-transitory computer-readable medium of claim 15, wherein at least a subset of the plurality of conditional probabilities can be evaluated, at least in part, on the sequence of events and the sequence of scenes.

17. A system comprising:
one or more processors;
a memory configured to store a set of instructions, which when executed by the one or more processors cause the system to perform operations comprising:
   applying at least one auto-directing model to media content obtained from one or more media sources during a first period of time to generate one or more editing actions applicable to media content, wherein the at least one auto-directing model comprises a plurality of conditional probabilities for predicting editing actions;
   causing performance of the one or more editing actions toward media content obtained from the one or more media sources during a second period of time to construct an output media content; and
   causing presentation of the output media content.

18. The system of claim 17, wherein the first period of time precedes the second prior of time.

19. The system of claim 17, wherein one or more editing actions comprise at least one of switching between media sources, changing an image view window, rotating an image, changing a focus, tracking one or more objects, zooming, fading in or out, or changing a layout.

20. The system of claim 17, wherein the operations further comprise causing performance of one or more user operations toward the media content obtained from the one or more media sources during the second period of time.

* * * * *